(12) United States Patent
Li et al.

(10) Patent No.: US 10,197,101 B2
(45) Date of Patent: Feb. 5, 2019

(54) DEEP GROOVE BALL BEARING WITH A ROTOR

(71) Applicant: Ningbo City Zehnhai Silver-Ball Bearing Co., Ltd., Ningbo (CN)

(72) Inventors: Zhigen Li, Ningbo (CN); Huahai Xiao, Xinghua (CN)

(73) Assignee: Ningbo City Zhenhai Silver-Ball Bearing Co., Ltd. (CN)

( * ) Notice: Subject to any disclaimer, the term of this patent is extended or adjusted under 35 U.S.C. 154(b) by 0 days.

(21) Appl. No.: 15/653,146

(22) Filed: Jul. 18, 2017

(65) Prior Publication Data

US 2018/0298950 A1   Oct. 18, 2018

(30) Foreign Application Priority Data

Apr. 17, 2017 (CN) .................... 2017 2 0403986 U

(51) Int. Cl.

| *F16C 9/04* | (2006.01) |
|---|---|
| *F16C 19/20* | (2006.01) |
| *F16C 33/80* | (2006.01) |
| *F16C 25/04* | (2006.01) |
| *F16C 33/78* | (2006.01) |

(Continued)

(52) U.S. Cl.
CPC .............. *F16C 35/042* (2013.01); *F16C 9/04* (2013.01); *F16C 19/20* (2013.01); *F16C 25/086* (2013.01); *F16C 33/583* (2013.01); *F16C 33/78* (2013.01); *F16C 33/7869* (2013.01); *F16C 33/80* (2013.01); *F16J 15/3444* (2013.01)

(58) Field of Classification Search
CPC .. F16C 9/04; F16C 19/18; F16C 19/20; F16C 25/086; F16C 33/581; F16C 33/583; F16C 33/605; F16C 33/78; F16C 33/785; F16C 33/7869; F16C 2380/26; F16C 33/80; F16J 15/3444
USPC ......... 384/52, 275, 446, 456, 488, 492, 477, 384/512, 513, 516; 277/349, 565
See application file for complete search history.

(56) References Cited

U.S. PATENT DOCUMENTS 2,913,289 A * 11/1959 Stevenson ............... F16C 33/78
                                                           277/378
3,838,901 A * 10/1974 Sampatacos ............. F01P 5/12
                                                           384/481

(Continued)

*Primary Examiner* — Marcus Charles
(74) *Attorney, Agent, or Firm* — Blank Rome LLP

(57) ABSTRACT

A deep groove ball bearing with a rotor is disclosed by the present invention. The deep groove ball bearing with a rotor comprises a mandrel, at least one bearing assembly structure mounted on the periphery of the mandrel, and a magnet structure; wherein the bearing assembly structure, along with the mandrel to constitute the deep groove ball bearing structure, includes an outer ring sleeved on the periphery of the mandrel, steel balls, and an inner sealing cover; wherein the periphery of the mandrel is provided with at least one lap of channel that matches with a groove provided on the inner surface of the outer ring, and the steel balls are installed between the channel and the groove; wherein an inner sealing cover is axially embedded in a sealing groove of the out ring for sealing an inner side of the outer ring; wherein the magnet structure includes a permanent magnet glued on the periphery of the mandrel, a reinforcing sleeve sleeved outside the permanent magnet, and a balance ring provided at one end of the permanent magnet.

10 Claims, 3 Drawing Sheets

(51) Int. Cl.
  *F16C 35/04* (2006.01)
  *F16C 25/08* (2006.01)
  *F16C 33/58* (2006.01)
  *F16J 15/34* (2006.01)

(56) References Cited

U.S. PATENT DOCUMENTS

| | | | | |
|---|---|---|---|---|
| 4,325,590 A | * | 4/1982 | Pethis | F16C 25/083 384/518 |
| 4,545,692 A | * | 10/1985 | Bras | B60B 27/0005 384/477 |
| 4,606,655 A | * | 8/1986 | Hofmann | B62K 19/34 384/458 |
| 4,619,458 A | * | 10/1986 | Mitumaru | F16J 15/004 277/353 |
| 4,992,023 A | * | 2/1991 | Baker | F04D 29/106 277/348 |
| 5,022,770 A | * | 6/1991 | Guasch | F16C 19/49 384/477 |
| 5,138,209 A | * | 8/1992 | Chuta | G11B 19/2009 310/51 |
| 5,341,569 A | * | 8/1994 | Takamizawa | F16C 19/08 29/898 |
| 5,599,111 A | * | 2/1997 | Miyazaki | F16C 19/08 384/512 |
| 5,690,433 A | * | 11/1997 | Hans | F04D 29/044 384/482 |
| 5,841,210 A | * | 11/1998 | Obara | F16C 19/08 310/90 |
| 6,181,513 B1 | * | 1/2001 | Obara | G11B 19/2009 360/99.08 |
| 9,360,051 B2 | * | 6/2016 | Schmidt | F16C 33/7853 |
| 2008/0131038 A1 | * | 6/2008 | Sendzik | F16C 19/49 384/44 |

* cited by examiner

DEEP GROOVE BALL BEARING WITH A ROTOR

RELATED APPLICATIONS

This application claims the benefit of Chinese Patent Application No. 201720403986.6, filed on Apr. 17, 2017. The entire content of this application is incorporated herein by reference.

TECHNICAL FIELD

The present invention relates to the field of bearings for micro-miniature precision motors, and particularly to a deep groove ball bearing with a rotor.

BACKGROUND

The motors available in micro-miniature motors market have a development tendency towards DC utilization, energy saving, miniaturization and high-speed rotation. Users require the motors to be small in size and high efficiency, with motor power to be generally 100~600 W, revolution speed to be between 8 and 25 million revolutions per minute. The bearings used in micro-miniature motors require not only to be small in size, but also to run smoothly under high revolution speed conditions, which is difficult to realize for the current bearing manufacturing.

SUMMARY OF THE INVENTION

In view of the above-mentioned problems in the prior art, a deep groove ball bearing with a rotor that is capable of running smoothly under high revolution speed conditions is provided. The deep groove ball bearing has a small size, good sealing performance and long service life.

Specific technical solutions are as follows:

A deep groove ball bearing with a rotor, comprising a mandrel, at least one bearing assembly structure mounted on a periphery of the mandrel, and a magnet structure; wherein, the bearing assembly structure, along with the mandrel to constitute the deep groove ball bearing structure, includes an outer ring sleeved on the periphery of the mandrel, steel balls, and an inner sealing cover; wherein the periphery of the mandrel is provided with at least one lap of channel that matches with a groove provided on an inner surface of the outer ring, and the steel balls are installed between the channel and the groove; wherein an end opening of the outer ring is axially embedded with an inner sealing cover for sealing an inner side of the outer ring;

wherein the magnet structure includes a permanent magnet glued on the periphery of the mandrel, a reinforcing sleeve sleeved outside the permanent magnet, and a balance ring provided at one end of the permanent magnet.

Preferably, the steel balls are limited between the outer ring and the mandrel by a nylon retainer.

Preferably, the periphery of the outer ring is also provided with a plurality of circumferential grooves for mounting O-rings.

Preferably, the periphery of the outer ring is also provided with a slot for glue storage.

Preferably, both numbers of channels and of grooves are two, and the balance ring is provided on a side of the permanent magnet away from the outer ring, and the mandrel is in the form of a multi-stage stepped shaft.

Preferably, the balance ring is provided on a side of the permanent magnet adjacent to the outer ring, and the mandrel is in a straight-through configuration.

Preferably, there are two bearing assembly structures respectively provided on the mandrel on either side of the magnet structure, and the inner side of the outer ring of each bearing assembly structure is respectively provided with one groove.

Preferably, the inner surface of the periphery of the outer ring is provided with a mounting groove in which an outer edge of the inner sealing cover is embedded; wherein the bearing assembly structure further comprises an outer shield, an outer edge of which is embedded in the mounting groove.

Preferably, the bearing assembly structure further comprises a spring coil, and the outer shield is positioned outside the inner sealing cover; wherein the spring coil is embedded in the mounting groove and fixes outer edges of the inner sealing cover and the outer shield; wherein the inner sealing cover, the outer shield and the spring coil conjointly form a labyrinth sealing structure at the periphery of the outer ring.

Preferably, the channel of the mandrel has a groove curvature of $Ri0.95_0^{+0.02}$ and a curvature coefficient of 0.528; the groove of the outer ring has a groove curvature of $Re0.96_0^{+0.02}$ and a groove curvature coefficient of 0.533.

The beneficial effects of the above technical solutions is that, the mandrel provided with the groove cooperates with the outer ring to form the deep groove ball bearing structure, and the permanent magnet, with the balance ring at one end thereof, is integrated on the mandrel, and the O-rings are provided at the periphery of the outer ring, so that the bearing runs smoothly under high revolution speed conditions, and has a small size, good sealing performance and long service life; O-rings are installed on the outer ring to facilitate the damping and assemble and disassemble; the outer edge of the outer ring of the bearing is provided with the slot for glue storage to facilitate glue injection as needed after the installation of the bearing, so as to facilitate axial positioning of the bearing.

DETAILED DESCRIPTION OF THE EMBODIMENTS

To make the technical means, creative features, purpose and effect achieved by the present invention easy to understand, the following embodiments illustrate specifically the deep groove ball bearing with a rotor presented by the present invention in conjunction with the accompanied FIGS. 1 to 4.

Embodiments 1

Figure 1:
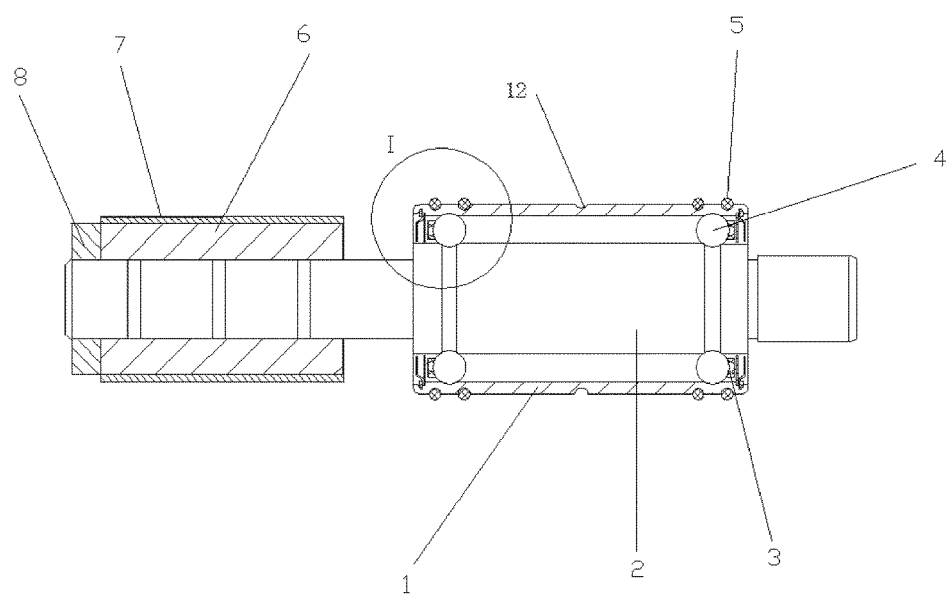
FIG. 1 is a structural schematic diagram of a first embodiment of the deep groove ball bearing with a rotor according to the present invention.
Figure 2:
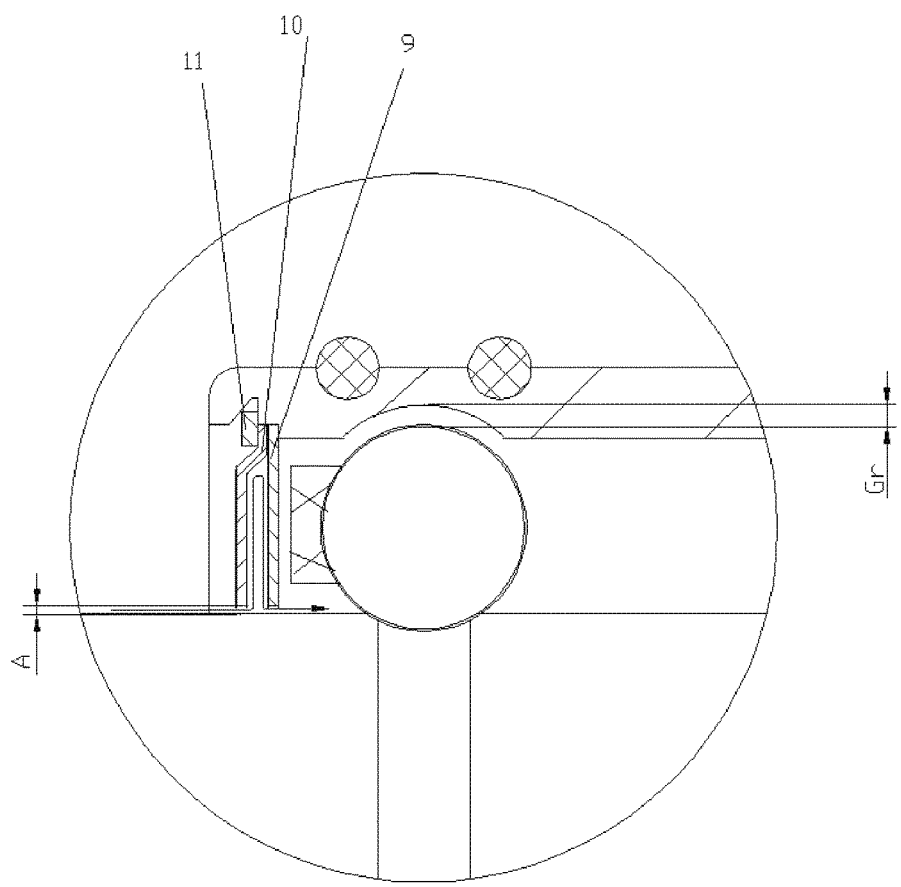
FIG. 2 is a partial enlarged view of part I in FIG. 1.

FIG. 1 is a structural schematic diagram of a first embodiment of the deep groove ball bearing with a rotor, and FIG. 2 is a partial enlarged view of part I in FIG. 1. As shown in FIGS. 1 and 2, the deep groove ball bearing with a rotor presented by the present invention comprises a mandrel 2, at least one bearing assembly structure mounted on a periphery of the mandrel 2, and a magnet structure, wherein the bearing assembly structure, along with the mandrel 2 to constitute the deep groove ball bearing structure, includes an outer ring 1 sleeved on the periphery of the mandrel 2, steel balls 4, and an inner sealing cover 9; wherein the periphery of the mandrel 2 is provided with at least one lap of channel 13 that matches with a groove provided on an inner surface of the outer ring 1, and the steel balls 4 are installed between the channel 13 and the groove; wherein an end opening of the out ring 1 is axially embedded with an inner sealing cover 9 for sealing an inner side of the outer ring 1, the mandrel 2 and the bearing assembly structure conjointly form the deep groove ball bearing structure; wherein the magnet structure includes a permanent magnet 6 glued on the periphery of the mandrel 2, a reinforcing sleeve 7 sleeved outside the permanent magnet 6, and a balance ring 8 provided at one end of the permanent magnet 6.

Specifically, in the embodiment, both numbers of channels 13 and of grooves are two. The steel balls 4 are limited between the outer ring 1 and the mandrel 2 by a nylon retainer 3. Further, the periphery of the outer ring 1 is also provided with a plurality of circumferential grooves for mounting O-rings. Furthermore, the periphery of the outer ring 1 is also provided with a slot 12 for glue storage.

In a preferred embodiment, the inner surface of the periphery of the outer ring 1 is provided with a mounting groove in which an outer edge of the inner sealing cover 9 is embedded; wherein the bearing assembly structure further comprises an outer shield 10, an outer edge of which is embedded in the mounting groove. Further, the bearing assembly structure further comprises a spring coil 11, and the outer shield 10 is positioned outside the inner sealing cover 9; wherein the spring coil 11 is embedded in the mounting groove and fixes outer edges of the inner sealing cover 9 and the outer shield 10; wherein the inner sealing cover 9, the outer shield 10 and the spring coil 11 conjointly form a labyrinth sealing structure at the periphery of the outer ring 1, which can effectively achieve the effect of dust proof and sealing so that dust is difficult to enter the interior of the outer ring 1.

As a further preferred embodiment, in the present embodiment, the balance ring 8 is provided on a side of the permanent magnet 6 away from the outer ring 1. Also, the mandrel 2 is in the form of a multi-stage stepped shaft.

During production of the embodiment, the mandrel 2 has a diameter of 3~8 mm, the outer ring 1 has an outer diameter between 10~20 mm. The mandrel 2 and an inner ring of the bearing are integrally formed in the embodiment, having a permanent magnet 6. As a result, a processing thereof requires special processing equipment with the linear speed of the grinding wheel should be greater than 60 m/s. The channel 13 of the mandrel 2 has a groove curvature of $Ri0.95_0^{+0.02}$ and a curvature coefficient of 0.528; and the groove of the outer ring 1 has a groove curvature of $Re0.96_0^{+0.02}$ and a groove curvature coefficient of 0.533. The approximate curvature coefficient design of the channel 13 of the mandrel 2 and the groove of the outer ring 1 improves the axial stability of the bearing. The groove curvature can be adjusted properly according to the needs of the process. The gap A between the inner ends of the inner sealing cover 9 and of the outer shield 10 and the mandrel 2 is set to 0.015 mm, as indicated by the letter A in FIG. 2, so that a labyrinth is formed between the inner sealing cover 9 and the outer shield 10, and dust is difficult to enter as a result of the small gap with the mandrel 2. The problems that the inner diameter orientation of the typical rubber sealing ring is easy to wear out and the seal is hard to maintain, are therefore solved.

Where the material of mandrel 2 is ZGCr15 high carbon chromium armor bearing steel, and the processing method of the mandrel 2 is: blank of the mandrel 2—tempering—soft grinding—quenching—freezing treatment—tempering—anti-fatigue strengthening treatment—rough grinding of outside surface—infeed grinding—fine grinding of outside surface—barrelling of outside surface—fine grinding of raceway—barrelling of outside surface—lapping of inner groove—barrelling of outside surface—stocking. The processing method of the outer ring 1 is: an turning part of outer ring—quenching and freezing treatment—cleaning—tempering—rough grinding of outside surface—grinding of end faces of both ends—fine grinding of outside surface—barrelling of outside surface—fine grinding of outer groove—barrelling of outside surface—lapping of outer groove—coping of outside surface and barrelling of outside surface—stocking. This steel has an excellent comprehensive performance, high and uniform hardness after quenching, good wearability and high contact fatigue strength, less impurities than common bearing steel, better performance, which can be used in high-speed precise and long-life bearing.

The accuracy of the processed mandrel 2 meets the following requirements: the outer diameter of the processed mandrel 2 is $7_{-0.005}^{+0.002}$ mm; the outer diameter of the step of the multi-stage structure of the mandrel 2 is $5_{-0.009}^{-0.004}$ mm; roughness is Ra0.16 um; roundness of the outer diameter is up to 0.0008 mm; cylindricity is 0.002 mm; radial runout is 0.002 mm. The outer ring 1 is made of quality bearing steel GCr15 and the processed outer ring 1 meets the following requirements: outer diameter is $\cancel{c}13^0_{-0005}$ mm; roughness of the outer surface is Ra0.16 um; roundness of the outer diameter is 0.0008 mm; radial runout is 0.004 mm; parallelism of the groove to end face is 0.005 mm. The channel 13 is roughly finished with 5,000-mesh oilstone and superfinished with 20,000-mesh oilstone, so that the roughness of the channel 13 of the inner and outer ring 1 is below 0.016 um after superfinishing, reducing the friction between the steel balls 4 and the channel 13 and improving the speed and efficiency of the bearing. The mandrel 2 and outer ring 1 can be assembled after qualified finishing. One end of the mandrel 2 and the outer ring 1 is mated according to the diameter of the channel, put onto ball die where the steel balls 4 are mounted; the steel balls 4 of the other end are mounted in the same way, clearance is measured, nylon retainers 3 are respectively mounted on both ends if the clearance is qualified, cleaning, high speed grease is injected, fix the inner sealing ring and the outer shield 10 are fixed respectively in the sealing groove of the outer ring 1 by the spring coil 11 using special tools, the deep groove ball bearing is formed, the grease is uniformed, the permanent magnet 66 is stuck thereto after vibration measurement is qualified, the balance ring 8 is then stuck and the reinforcing sleeve 7 is installed. In addition, the dynamic balance is adjusted by the balance ring 8 to ensure stability under high revolution speed of the rotor.

As shown in FIG. 2, the radial clearance Gr between the mandrel 2 and the outer ring 1 is 0.005 to 0.010 mm. The clearance can be properly adjusted as needed to meet the requirements of a revolution speed of 80,000 to 200,000 r/min of the motor by customer. The groove curvature of the mandrel 2 of the bearing is $0.95_0^{+0.02}$, the curvature coefficient is 0.528; the groove curvature of the outer ring 1 is $0.96_0^{+0.02}$, the groove curvature coefficient is 0.533. The groove curvature coefficient of the outer ring 1 is relatively larger than that of the mandrel 2, which can reduce the contact area between the rolling element and the inner and outer ring 1 to reduce friction and thus to improve the flexibility of the bearing.

Two O-rings 5 are installed respectively on both ends of the outer edge of the outer ring 1 to facilitate the damping and assemble and disassemble. The outer edge of the outer ring 1 is provided with the slot for glue storage to facilitate glue injection as needed after the installation of the bearing, so as to facilitate axial positioning of the bearing. Thus, the requirements for ultrahigh speed, high efficiency, sealing and energy-saving of the bearing by host manufacturers are met. The outer ring 1 is made of quality bearing steel GCr15 and the processed outer ring 1 meets the following requirements: outer diameter is $13^0_{-0.005}$ mm; roughness of the outer surface is Ra0.16 um; roundness of the outer diameter is 0.0008 um; cylindricity is 0.002 mm; parallelism of the channel 13 to end face is 0.005 mm. The channel 13 is roughly finished with 5,000-mesh oilstone and superfinished with 20,000-mesh oilstone, so that the roughness of the channel 13 of the inner and outer ring 1 is below 0.016 um after superfinishing, reducing the friction between the steel balls 4 and the channel 13 and improving the speed and efficiency or the bearing.

In the above technical solution, the mandrel 2 provided with the channel 13 cooperates with the outer ring 1 to form the deep groove ball bearing structure, and the permanent magnet 6, with the balance ring at one end thereof, is integrated on the mandrel 2, and the O-rings 5 are provided at the periphery of the outer ring 1, so that the bearing runs smoothly under high revolution speed conditions, and has a small size, good sealing performance and long service life; O-rings 5 are installed on the outer ring 1 to facilitate the damping and assemble and disassemble; the outer edge of the outer ring 1 of the bearing is provided with the slot 12 for glue storage to facilitate glue injection as needed after the installation of the bearing, so as to facilitate axial positioning of the bearing.

Embodiments 2

Figure 3:
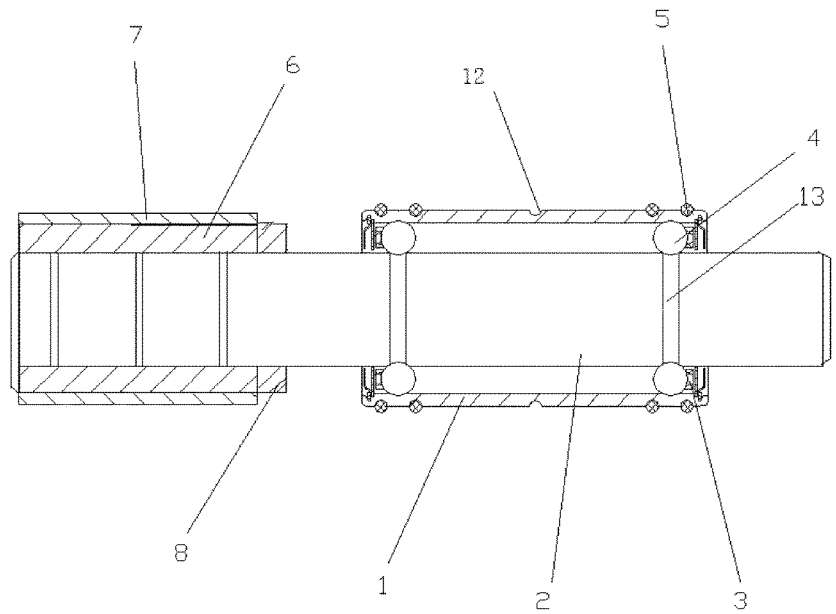
FIG. 3 is a structural schematic diagram of a second embodiment of the deep groove ball bearing with a rotor according to the present invention.

Referring to FIG. 3, a structural schematic diagram of a second embodiment of the deep groove ball bearing with a rotor is shown. The structure and content of the deep groove ball bearing with a motor presented by this embodiment are substantially the same as those of the above-described embodiment 1, except that in the present embodiment, the balance ring 8 is provided on the side of the permanent magnet 6 adjacent to the outer ring 1, and the mandrel 2 is in a straight-through configuration.

Embodiments 3

Figure 4:
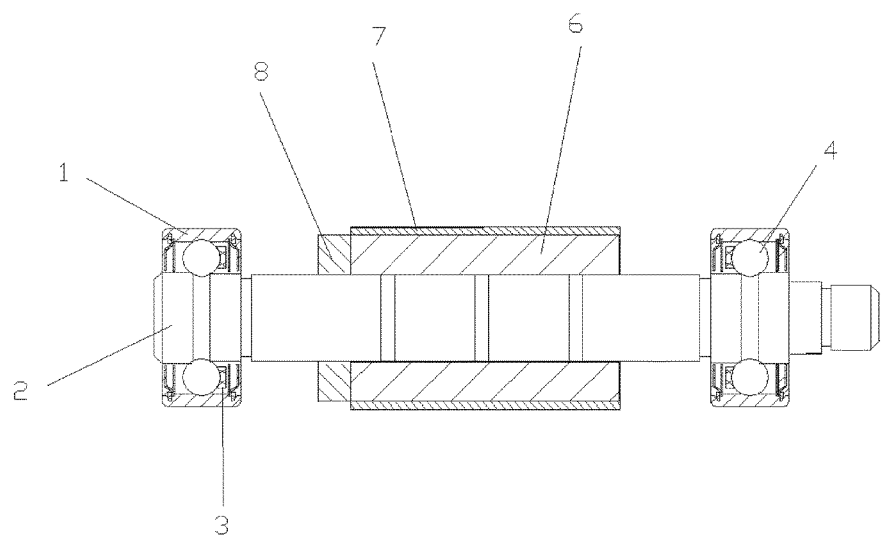
FIG. 4 is a structural schematic diagram of a third embodiment of the deep groove ball bearing with a rotor according to the present invention.

Referring to FIG. 4, a structural schematic diagram of a third embodiment of the deep groove ball bearing with a rotor is shown. The structure and content of the deep groove ball bearing with a motor presented by this embodiment are substantially the same as those of the above-described embodiment 1, except that in the present embodiment, there are two bearing assembly structures and one magnet structure, wherein the two bearing assembly structures are provided on the mandrel 2 on either side of the magnet structure, respectively. And the inner side of the outer ring 1 of each bearing assembly structure is respectively provided with one groove. In specific implementation, the permanent magnet, reinforcing sleeve and balance ring can be first stuck onto the mandrel and the outer rings on both ends are then assembled with the reinforcing sleeve and balance ring as needed.

The above are only preferred embodiments of the present invention, and is only illustrative rather than restrictive for the present invention. It will be understood by those skilled in the art that many variations, modifications, and even equivalents may be made thereto without departing from the spirit and scope of the invention as defined by the appended claims, which will all fall within the scope of the protection of the present invention.

The invention claimed is:

1. A deep groove ball bearing with a rotor, comprising a mandrel, at least one bearing assembly structure mounted on a periphery of the mandrel, and a magnet structure; wherein,
   the bearing assembly structure, along with the mandrel to constitute the deep groove ball bearing structure, includes an outer ring sleeved on the periphery of the mandrel, steel balls, and an inner sealing cover; wherein the periphery of the mandrel is provided with at least one lap of channel that matches with a groove provided on an inner surface of the outer ring, and the steel balls are installed between the channel and the groove; wherein an inner sealing cover is axially embedded in a sealing groove of the out ring for sealing an inner side of the outer ring;
   wherein the magnet structure includes a permanent magnet glued on the periphery of the mandrel, a reinforcing sleeve sleeved outside the permanent magnet, and a balance ring provided at one end of the permanent magnet.

2. The deep groove ball bearing with a rotor of claim 1, wherein the steel balls are mounted between the outer ring and the mandrel by a nylon retainer, and a radial clearance Gr is disposed between the steel balls and the groove of the outer ring to facilitate turning of the steel balls within the groove.

3. The deep groove ball bearing with a rotor of claim 2, wherein a periphery of the outer ring is also provided with a plurality of circumferential grooves for mounting O-rings.

4. The deep groove ball bearing with a rotor of claim 3, wherein the periphery of the outer ring is also provided with a slot for glue storage.

5. The deep groove ball bearing with a rotor of claim 4, wherein numbers of the channel and of the groove are two, and the balance ring is provided on a side of the permanent magnet away from the outer ring, and the mandrel is in the form of a multi-stage stepped shaft.

6. The deep groove ball bearing with a rotor of claim 5, wherein the inner surface of the periphery of the outer ring is provided with a mounting groove in which an outer edge of the inner sealing cover is embedded, wherein the bearing assembly structure further comprises an outer shield, an outer edge of which is embedded in the mounting groove.

7. The deep groove ball bearing with a rotor of claim 6, wherein the bearing assembly structure further comprises a spring coil, and the outer shield is positioned outside the inner sealing cover, wherein the spring coil is embedded in the mounting groove and fixes outer edges of the inner sealing cover and the outer shield, wherein the inner sealing cover, the outer shield and the spring coil conjointly form a labyrinth sealing structure at the periphery of the outer ring.

8. The deep groove ball bearing with a rotor of claim 7, wherein the channel of the mandrel has a groove curvature of $Ri0.95_0^{+0.02}$ and a curvature coefficient of 0.528; the groove of the outer ring has a groove curvature of $Re0.96_0^{+0.02}$ and a groove curvature coefficient of 0.533.

9. The deep groove ball bearing with a rotor of claim 4, wherein the balance ring is provided on the side of the permanent magnet adjacent to the outer ring, and the mandrel is in a straight-through configuration.

10. The deep groove ball bearing with a rotor of claim 4, wherein there are two bearing assembly structures respectively provided on the mandrel on either side of the magnet structure, and the inner side of the outer ring of each bearing assembly structure is respectively provided with one said groove.

* * * * *

UNITED STATES PATENT AND TRADEMARK OFFICE
CERTIFICATE OF CORRECTION

| | | |
|---|---|---|
| PATENT NO. | : 10,197,101 B2 | Page 1 of 1 |
| APPLICATION NO. | : 15/653146 | |
| DATED | : February 5, 2019 | |
| INVENTOR(S) | : Zhigen Li et al. | |

It is certified that error appears in the above-identified patent and that said Letters Patent is hereby corrected as shown below:

On the Title Page

Item (71), In the Applicant, change, "Ningbo City Zehnhai Silver-Ball Bearing Co., Ltd." to --Ningbo City Zhenhai Silver-Ball Bearing Co., Ltd.--.

Signed and Sealed this
Twenty-seventh Day of August, 2019

Andrei Iancu
*Director of the United States Patent and Trademark Office*